INVENTOR.
Edward N. Cole
BY
C. K. Veenstra
ATTORNEY

United States Patent Office 3,674,441
Patented July 4, 1972

3,674,441
EXHAUST EMISSION CONTROL
Edward N. Cole, Bloomfield Hills, Mich., assignor to General Motors Corporation, Detroit, Mich.
Filed Nov. 9, 1970, Ser. No. 87,743
Int. Cl. F01n 3/14; B01j 9/04
U.S. Cl. 23—288 F
7 Claims

ABSTRACT OF THE DISCLOSURE

Internal combustion engine exhaust gases, passing unconverted through an exhaust gas catalytic converter during the warm-up period of the catalyst bed, are directed to a bed of storage material which separates and retains undesirable constituents of the exhaust gases. After warm-up of the catalyst bed, the retained constituents are purged from the storage bed and recirculated to and converted in the catalyst bed. The storage bed supplements the emission control of the catalyst bed by reducing emission of undesirable exhaust gas constituents during starting of the engine and warm-up of the catalyst bed.

BACKGROUND OF THE INVENTION

Extensive development over the past several years indicates that exhaust gas catalytic converters have potential for converting substantially all the undesirable constituents in internal combustion engine exhaust gases. However, the catalysts used in such converters are relatively inefficient at ambient temperatures, and the thermal mass of the catalyst cannot be warmed to an efficient conversion temperature instantaneously. A period of about one to four minutes is usually required for the exhaust gases to heat the catalyst bed to its efficient conversion temperature. Thus exhaust gases formed during starting of the engine and during this warm-up period are incompletely converted. It is believed that a very high proportion of the undesirable exhaust gas constituents emitted from an engine equiped with an exhaust gas catalytic converter are emitted during this warm-up period.

SUMMARY OF THE INVENTION

This invention relates to internal combustion engines equipped with exhaust gas catalytic converters and is designed to reduce emission of undesirable exhaust gas constituents from engines equipped with such converters during starting of the engine and during warm-up of the catalyst bed.

In particular, this invention retains exhaust gas constituents passing unconverted through a catalyst bed when the temperature of the catalyst bed is below is efficient conversion temperature and recirculates these constituents to the catalyst bed after the catalyst bed reaches its efficient conversion temperature.

In the preferred embodiment of this invention as set forth herein, the catalyst and storage beds are disposed in side-by-side conversion and storage chambers which permits a compact exhaust emission control device to be installed on an internal combustion engine-powered vehile without resort to extension external pipe connections.

The details as well as other objects and advantages of this invention are shown in the drawing and are set forth in the description of the various embodiments.

DESCRIPTION OF THE EMBODIMENTS

Figure 1:
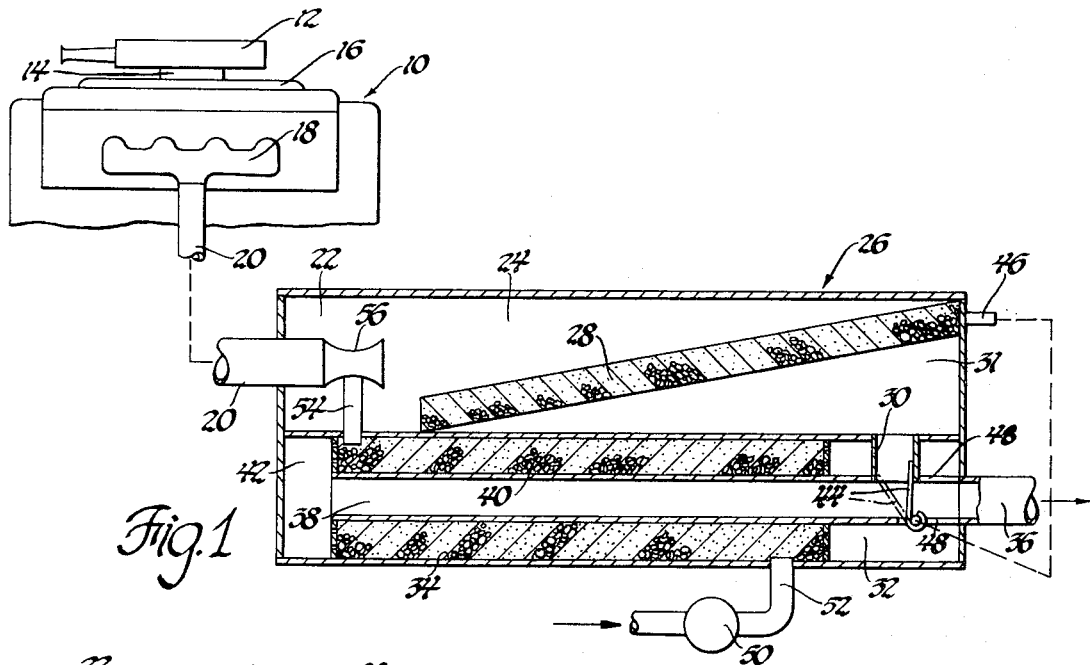
FIG. 1 is a schematic view of a primary embodiment of this invention showing an exhaust emission control device having side-by-side conversion and storage chambers connected to an internal combustion engine. A flapper-type flow control valve directs the exhaust gases through the storage bed when the catalyst bed is below its efficient conversion temperature. An air pump and an exhaust pipe venturi provide a flow of air through the storage bed to the catalyst bed.

Referring first to FIG. 1, an internal combustion engine 10 has an air cleaner 12, a carburetor 14, and an intake manifold 16 which define an air induction passage leading to the engine combustion chambers. Engine 10 also has an exhaust passage defined by an exhaust manifold 18, which receives gases exhausted from the combustion chambers, and an exhaust pipe 20.

Exhaust pipe 20 opens into one end 22 of a conversion chamber 24 in the exhaust emission control device 26. A catalyst bed 28 is disposed across conversion chamber 24.

A transfer pipe 30 opens from the opposite end 31 of conversion chamber 24 and extends to the adjacent end 32 of a storage chamber 34. A discharge pipe 36 leads from the end 32 of storage chamber 34. As shown here, discharge pipe 36 leads directly to the atmosphere; however, in some instances it may be desired to incorporate other exhaust emission control devices in discharge pipe 36.

A duct 38 leads from the end 32 of storage chamber 34, through a storage bed 40 of activated charcoal, to the opposite end 42 of storage chamber 34.

Catalyst bed 28 can efficiently promote conversion of undesirable exhaust gas constituents under most conditions of operation, thereby preventing emission of such constituents to the atmosphere. However, catalyst bed 28 must be heated to a minimum temperature to cause the necessary conversion. Catalyst bed 28 is easily heated by the exhaust gases, but a period of about one to four minutes is usually required before the bed reaches the minimum temperature. Thus exhaust gases formed when starting the engine and during initial operation are not efficiently converted.

In this invention, a valve 44, operated by a sensor 46 which is responsive to the temperature of catalyst bed 28, blocks the direct flow of exhaust gases from transfer pipe 30 to discharge pipe 36 and diverts the flow of exhaust gases through duct 38 to the opposite end 42 of storage chamber 34 when catalyst bed 28 is cold. The exhaust gases pass into charcoal storage bed 40 through a plurality of apertures at the left-hand end. The activated charcoal adsorbs and retains the unburned hydrocarbon constituents of the exhaust gases, and the remaining exhaust gases are discharged through a plurality of apertures at the right-hand end of bed 40, into the end 32 of storage chamber 34, around transfer pipe 30, and out through one or more openings 48 into discharge pipe 36.

When catalyst bed 28 has been warmed to its efficient conversion temperature, sensor 46 moves valve 44 to the dotted line position shown in the drawing, thus permitting the converted exhaust gases to flow directly to discharge pipe 36.

An air pump 50 delivers air into charcoal bed 40 through an inlet 52 disposed at a location adjacent the end 32 of storage chamber 34. An air outlet 54 extends from charcoal bed 40, at a location adjacent the opposite end 42 of storage chamber 34 to a venturi 56 near the end of exhaust pipe 20. Pump 50 and venturi 56 cooperate to provide a flow of air through charcoal bed 40 to catalyst bed 28. The air thus provided supports conversion of undesirable exhaust gas constituents in catalyst bed 28 and also purges exhaust gas constituents from charcoal bed 40. Thus the undesirable constituents which were adsorbed by charcoal bed 40 are recirculated to catalyst bed 28 for conversion therein, and charcoal bed 40 is regenerated for subsequent adsorption.

In this manner, this invention provides continuous control of exhaust gases formed in engine 10. During most conditions of operation, catalyst bed 28 converts undesirable exhaust gas constituents and prevents emission thereof to the atmosphere. During the period required for warm-up of catalyst bed 28, the undesirable constituents are stored in charcoal bed 40 for subsequent recirculation to and conversion in catalyst bed 28.

It will be appreciated that a metering orifice or flow control valve may be included in air inlet 52, air outlet 54, or both to control the rate of air flow under various operating conditions and to shut off air flow under some operating conditions.

It has been determined that charcoal bed 40 ceases to adsorb hydrocarbons when its temperature rises above a certain level. In many instances, this temperature level will be reached about the time that catalyst bed 28 reaches its efficient conversion temperature. Thus it may be desirable in some instances to position sensor 46 so that it will respond to the temperature of storage bed 40. Of course, sensor 46 also may be positioned to sense exhaust gas or pipe temperatures at some other location in or around device 26.

In addition, it should be recognized that a storage material such as charcoal may itself experience an oxidation reaction if subjected to high temperatures for a prolonged period of time. In such circumstances, a device such as sensor 46 should be used to move valve 44 to the dotted line position shown in the drawing. Insulation could be provided between conversion chamber 24 and charcoal bed 40 to limit heat flow from catalyst bed 28 to charcoal bed 40 and thus avoid initiation of the charcoal oxidation reaction.

Figure 2:
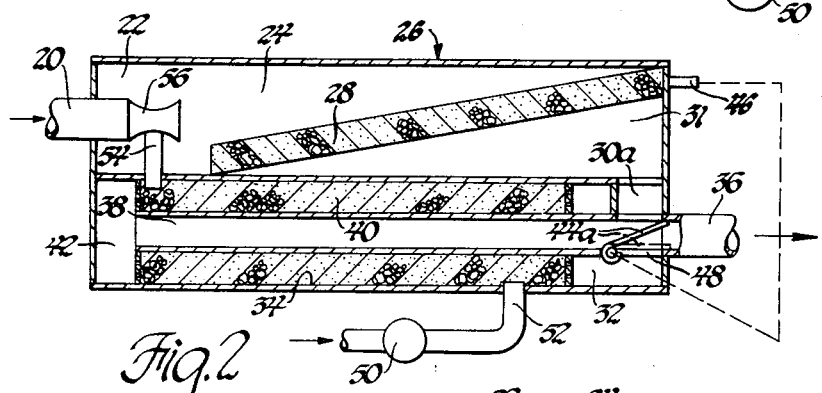
FIG. 2 is a schematic view of another embodiment of this invention, similar in most respects to that shown in FIG. 1, in which the flapper valve is designed to blow open in the event the exhaust back pressure exceeds a predetermined level.

Referring next to the embodiment of FIG. 2, a modified valve 44a is provided which will blow open to the dotted line position shown in the drawing in the event that the exhaust back pressure in transfer pipe 30a rises above a predetermined level.

Figure 3:
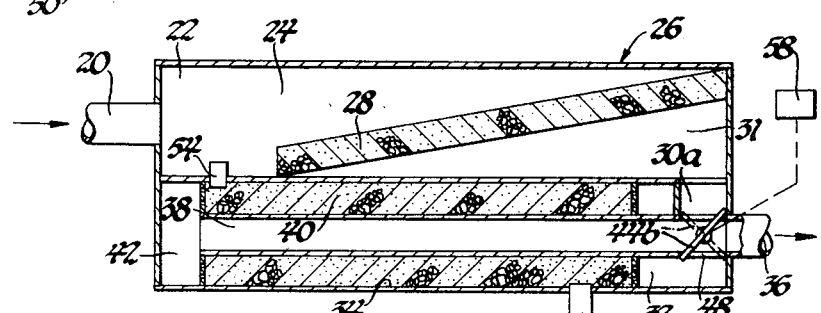
FIG. 3 is a schematic view of an additional embodiment of this invention, also similar in most respects to that of FIG. 1, in which a butterfly-type flow control valve is operated by a time delay unit and in which an air pump alone is used to deliver air through the storage bed to the conversion bed.
Figure 4:
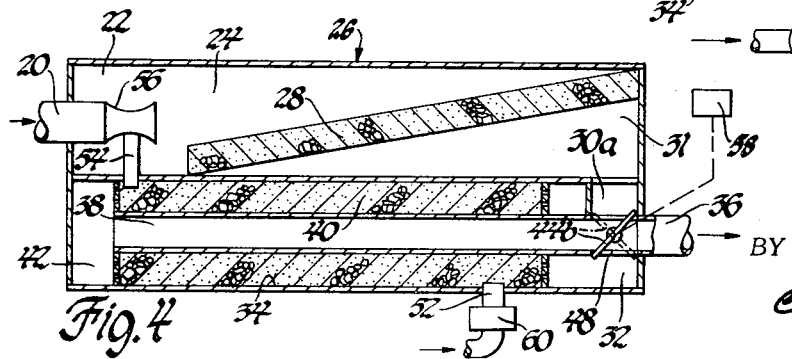
FIG. 4 is a schematic view of a further embodiment of this invention, again similar in most respects to that of FIG. 1, in which the flapper valve is designed to blow open erated by a time delay unit and in which an exhaust pipe venturi alone is used to induce air flow through the storage bed to the conversion bed.

With reference now to FIGS. 3 and 4, it will be appreciated that the time required for catalyst bed 28 to reach its efficient conversion temperature is generally predictable from the thermal mass of the bed and the available heat of the exhaust gases. Experience has shown that this time may be closely approximated by a time delay unit which measures the time duration of the exhaust gas flow used to heat the catalyst bed. Thus the embodiments of FIGS. 3 and 4 utilize a time delay unit 58 to control the operation of device 26.

It will be noted, in the FIG. 1 embodiment, that openings 48 between the end 32 of storage chamber 34 and discharge pipe 36 remain open in both positions of flapper valve 44. In the FIG. 2 embodiment, duct 38 remains in communication with transfer pipe 30a in both positions of flapper valve 44a. As shown in FIGS. 3 and 4, a butterfly valve 44b may be used; when butterfly valve 44b is moved to the dotted line position shown in the drawing, storage chamber 34 is entirely cut off from transfer pipe 30a and discharge pipe 36. It will be appreciated that other valving systems, such as those using poppet valves, also may be utilized in this invention.

FIGS. 3 and 4 also show that air pump 50 and venturi 56 may be used individually to deliver or induce a flow of air through charcoal bed 40 into conversion chamber 24. The pressure conditions in conversion chamber 24 above and below catalyst bed 28, the delivery characteristics of air pump 50, the induction characteristics of venturi 56, and the flow restrictions in air inlet 52 and outlet 54 will determine which of the various systems for providing air flow through charcoal bed 40 into conversion chamber 24 will be most advantageous in a particular system.

As shown in FIG. 4, where venturi 56 alone is relied upon to induce air flow, a check valve 60 may be required on air inlet 52 to prevent leakage of exhaust gases at this point.

From the foregoing, it will be appreciated that this invention provides a two-stage device for controlling exhaust emissions. As the engine is started and during initial operation, undesirable exhaust gas constituents are retained in a storage bed. After the warm-up period, a catalyst bed is utilized to reduce emission of undesirable constituents and the unconverted constituents formed during starting and warm-up are recirculated through and converted in the catalyst bed.

Several advantages of this device are also apparent from the foregoing. For example, charcoal storage bed 40 is located close to catalytic conversion bed 28 and thus is subjected to the heat generated by the conversion process. Such heat promotes desorption of the hydrocarbons from the charcoal and thus facilitates purging of the exhaust gas constituents retained in storage bed 40. It is anticipated, therefore, that the effectiveness of storage bed 40 to separate and store exhaust gas constituents will not diminish substantially even after a large number of charging and purging cycles.

I claim:

1. A two-stage device for controlling emission of undesirable exhaust gas constituents formed in an internal combustion engine comprising:

a housing forming side-by-side conversion and storage chambers, an exhaust pipe opening into one end of said conversion chamber for delivering exhaust gases from said engine to said conversion chamber, a catalytic conversion bed disposed in said conversion chamber and effective at temperatures above a certain level to promote conversion of undesirable exhaust gas constituents passing through said conversion chamber from said exhaust pipe, a transfer pipe opening from the other end of said conversion chamber to the end of said storage chamber adjacent said other end of said conversion chamber for delivering exhaust gases from said conversion chamber to said storage chamber, a discharge pipe opening from said adjacent end of said storage chamber to the atmosphere, a duct extending from said adjacent end of said storage chamber to the opposite end of said storage chamber for delivering exhaust gases from said transfer pipe to said opposite end of said storage chamber.

a storage bed means disposed in said storage chamber and effective at temperatures below said certain level to retain undesirable constituents of the exhaust gases passing therethrough from said duct at said opposite end of said storage chamber to said discharge pipe at said adjacent end of said storage chamber, valve means for causing exhaust gases to flow from said transfer pipe through said duct and said storage bed means to said discharge pipe at temperatures below said certain level and for causing exhaust gases to flow from said transfer pipe directly to said discharge pipe at temperatures above said certain level, whereby exhaust gases passing unconverted through said conversion bed at temperatures below said certain level are delivered to said storage bed means and undesirable constituents of said exhaust gases are retained in said storage bed means and whereby undesirable exhaust gas constituents are converted in passing through said conversion bed at temperatures above said certain level and the converted exhaust gases are delivered directly to said discharge pipe.

an air inlet means entering said storage bed means at a location near said adjacent end of said storage chamber, said air inlet means providing for air injection into said storage chamber, but preventing passage of exhaust gases from said storage chamber via said air inlet means, and an air outlet opening to said one end of said conversion chamber from said storage bed means at a location near said opposite end of said storage chamber, whereby air is delivered through said storage bed to said conversion bed to support conversion of undesirable exhaust gas constituents in said conversion bed and to purge undesirable exhaust gas constituents from said storage bed means and recirculate such undesirable exhaust gas constituents to said conversion bed for converison therein.

2. The emission control device of claim 1 wherein said storage bed means comprises activated charcoal effective to retain hydrocarbon exhaust gas constituents.

3. The emission control device of claim 1 which further comprises an air pump connected to said air inlet means for delivering air thereto.

4. The emission control device of claim 1 which further comprises means for lowering the pressure at said air outlet to induce air flow through said storage bed means.

5. The emission control device of claim 1 wherein said valve means further causes exhaust gases to flow from said transfer pipe directly to said discharge pipe when the pressure in said transfer pipe exceeds a predetermined level.

6. The emission control device of claim 1 which further comprises means for measuring the temperature in said device and for controlling said valve means in accordance therewith.

7. The emission control device of claim 1 which further comprises means for measuring the time duration of exhaust gas flow therethrough and for controlling said valve means in accordance therewith.

References Cited

UNITED STATES PATENTS

| | | |
|---|---|---|
| 1,522,111 | 1/1925 | Frank-Philipson. |
| 2,942,932 | 6/1960 | Elliott _____ 23—2 E |
| 3,086,839 | 4/1963 | Bloch _____ 23—288 F X |
| 3,149,926 | 9/1964 | Johnson _____ 23—288 F |
| 3,150,922 | 9/1964 | Ashley _____ 23—288 F X |
| 3,189,417 | 6/1965 | Houdry et al. _____ 23—288 F |
| 3,260,566 | 7/1966 | Fisher _____ 23—288 F X |
| 3,273,971 | 9/1966 | Baddorf et al. _____ 23—288 F |
| 3,297,400 | 1/1967 | Eastwood _____ 23—288 F X |
| 3,429,656 | 2/1969 | Taylor et al. _____ 23—288 F X |
| 3,477,826 | 11/1969 | Moyer et al. _____ 23—288 F |

JOSEPH SCOVRONEK, Primary Examiner

B. S. RICHMAN, Assistant Examiner

U.S. Cl. X.R.

23—2 E; 60—30 R